UNITED STATES PATENT OFFICE.

BRUNO RICHARD SEIFERT, OF RADEBEUL, GERMANY, ASSIGNOR TO CHEMISCHE FABRIK VON HEYDEN GESELLSCHAFT MIT BESCHRÄNKTER HAFTUNG, OF SAME PLACE.

PROCESS OF MAKING AROMATIC NITROSULFO CHLORIDS.

SPECIFICATION forming part of Letters Patent No. 578,839, dated March 16, 1897.

Application filed May 9, 1896. Serial No. 590,943. (No specimens.) Patented in Belgium July 27, 1895, No. 116,732.

*To all whom it may concern:*

Be it known that I, BRUNO RICHARD SEIFERT, of Radebeul, near Dresden, in the Kingdom of Saxony, German Empire, have invented a new Process for the Manufacture of Aromatic Nitrosulfo Chlorids, of which the following is a specification, and for which I have obtained Brevet d'Invention in Belgium No. 116,732, dated July 27, 1895.

Aromatic nitrosulfo chlorids have hitherto been prepared by an extremely complicated process. For example, in order to obtain nitrobenzene-sulfo chlorid it has been customary, in the first place, to convert the nitrobenzene, in the presence of sulfuric acid, into the nitrobenzene sulfonic acid. By the addition of chalk the surplus of sulfuric acid was then transformed into gypsum. The gypsum was next separated from the nitrobenzene sulfonate of calcium by filtration, after which, by the addition of soda, the calcium salt was converted into sodium salt, which was then filtered off from the carbonate of lime, whereupon it was concentrated, dried, and, lastly, in the presence of phosphor-pentachlorid, converted into nitrobenzene-sulfo chlorid, which was separated from the phosphor-oxychlorid by distillation or by treatment with water. This series of complicated operations I have succeeded in materially simplifying, thereby rendering the manufacture less expensive; and this object I attain by treating the nitrobenzene or other aromatic nitro body with chlorhydrin sulfuric acid, so that by a single operation nitrosulfo chlorid is directly obtained.

Already Armstrong (compare *Berichte der Deutschen Chemischen Gesellschaft*, IV, 356, and *Zeitschrift für Chemie*, 1871, 321) has treated the nitrobenzene with chlorhydrin sulfuric acid; but he obtained an essentially different reaction to mine. Armstrong treated nitrobenzene diluted by sulfuret of carbon with one molecule of chlorhydrin sulfuric acid in accordance with the following formula:

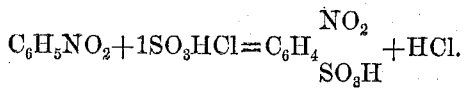

Armstrong did not obtain nitrobenzene-sulfo chlorid, but, on the contrary, nitrobenzene sulfonic acid only. However, according to my present process one molecule of nitrobenzene is brought into reaction with more than one molecule, preferably with two molecules, or more, of chlorhydrin sulfuric acid. In this way the reaction taking place in accordance with the following formula:

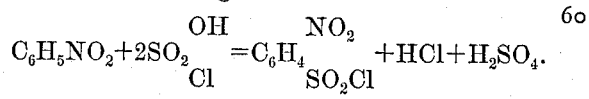

Incidentally a small quantity of the nitrosulfonic acid is formed at the same time.

I am aware that heretofore, by the action of chlorhydrin sulfuric acid upon non-nitrified hydrocarbons, sulfo chlorids have been produced, such as toluene-sulfo chlorid, from toluene. (Compare Beckurt's *Berichte der Deutschen Chemischen Gesellschaft*, XII.) The transfer of this method to the production of nitrosulfo chlorids from nitrified hydrocarbons, however, is a novelty. In transferring directly this known reaction from the toluene to the nitrotoluene no or only small quantities of nitrosulfo chlorids are obtained. To obtain nitrosulfo chlorids, it is necessary to provide for some modifications of that method.

In preparing non-nitred sulfo chlorids it is necessary to cool the chlorhydrin and to add the hydrocarbon but very slowly thereto. If the same method were applied to nitrohydrocarbons, almost no chlorid would be obtained, and to obtain it it is, on the contrary, requisite to heat the mass of reagents, and the entire quantity of the nitrohydrocarbon may be mixed with the chlorhydrin beforehand and at one time.

Example: Seventy-five kilograms of nitrobenzene are mixed with one hundred and fifty kilograms of chlorhydrin sulfuric acid. The mixture is heated by the indirect action of steam until there is no more hydrochloric acid gas evolved. The liquid mass of reaction is then poured onto ice, which, on coming into contact with it, melts. The nitrobenzene-sulfo chlorid remains behind undissolved and is filtered or strained off and washed with water. The aqueous mother-lye contains in addition to sulfuric acid a small amount of nitrobenzene sulfonic acid, which in the well-known manner may be converted into sodium salt, from which, by treatment with chlorids of mineral acids, there may be derived a further small quantity of nitrobenzene-sulfo chlorid.

If, instead of the nitrobenzene, orthonitrotoluene and paranitrotoluene or nitrometaxylol ($CH_3 : CH_2 : NO_2 = 1 : 3 : 6$) or metachlornitrobenzene be employed, the following chlorids will be obtained:

Nitrotoluenesulfo chlorid, ($CH_3 : NO_2 : SO_2Cl = 1 : 2 : 4$.)
Nitrotoluenesulfo chlorid, ($CH_3 : NO_2 : SO_2Cl = 1 : 4 : 2$.)
Nitroxylenesulfo chlorid, ($CH_3 : CH_3 : SO_2Cl : NO_2 = 1 : 3 : 4 : 6$.)
Chlornitrobenzenesulfo chlorid, ($Cl : NO_2 : SO_2Cl = 1 : 3 : (5?)$.)

These nitrosulfo chlorids may be utilized in a variety of ways as intermediate products for the ulterior production of other chemical agents.

What I claim as my invention is—

1. The within-described process for the manufacture of aromatic nitrosulfo chlorids consisting in treating aromatic nitro compounds with chlorhydrin sulfuric acid in excess of one molecule, substantially as herein described.

2. The within-described process of manufacturing aromatic nitrosulfo chlorids consisting in first heating together a mixture of an aromatic nitro compound and chlorhydrin sulfuric acid in excess as stated to produce the expulsion of hydrochloric acid, next pouring the liquid mass of this reaction onto ice to produce the precipitation of nitrobenzene-sulfo chlorid and straining off the latter from the mother-lye, next converting the nitrobenzene sulfonic acid in the mother-lye into sodium salt, and finally treating the latter salt with the chlorid of a mineral acid to obtain therefrom a further small quantity of nitrobenzene-sulfo chlorid, substantially as herein described.

In testimony that I claim the foregoing as my invention I have signed my name in presence of two subscribing witnesses.

BRUNO RICHARD SEIFERT.

Witnesses:
HERNANDO DE SOTO,
PAUL ARRAS.